United States Patent

[11] 3,568,954

[72] Inventor William C. McCorkle, Jr.
Huntsville, Ala.
[21] Appl. No. 540,480
[22] Filed Apr. 4, 1966
[45] Patented Mar. 9, 1971
[73] Assignee The United States of America as represented by the Secretary of the Army

[54] DIRECTIONAL CONTROL-AUTOMATIC METEOROLOGICAL COMPENSATION (D.C.-AUTOMET) INERTIAL GUIDANCE SYSTEM FOR ARTILLERY MISSILES
9 Claims, 5 Drawing Figs.

[52] U.S. Cl.................................................... 244/3.2,
244/3.22
[51] Int. Cl..................................................... F42b 15/18
[50] Field of Search........................................... 244/3.14,
3.15, 3.19, 3.20, 3.22, 3.23, 3.21

[56] References Cited
UNITED STATES PATENTS
2,979,284 4/1961 Genden et al................. 244/3.14
3,008,668 11/1961 Darlington................... 244/3.11
3,184,182 5/1965 May et al..................... 244/3.22
3,249,325 5/1966 Forehand..................... 244/3.22

Primary Examiner—Verlin R. Pendegrass
Attorneys—Harry M. Saragovitz, Edward J. Kelly, Herbert Berl and Harold W. Hilton ABSTRACT: A missile system disposed for flight in a planned trajectory ending at a target. The trajectory includes booster propulsion and sustainer propulsion phases of flight. The missile is controlled in the booster propulsion phase by means of a directionally controlled (D.C.) inertial guidance system which controls thrust direction. Booster control means is provided for creating pressure differentials across the propulsive gases of the booster motor for thrust vectoring the missile to maintain the missile in the trajectory during the booster propulsion phase of flight. In the sustainer phase of flight, the missile is controlled by an automatic meteorological compensation inertial guidance system (AUTOMET) which controls thrust magnitude. Sustainer control means is provided for varying the thrust of the sustainer to maintain the difference in the actual and desired velocities at null and thus maintain zero net axial force on the missile in the sustainer phase of flight. The system is, therefore, known as the D.C.-AUTOMET guidance system.

Previous inertial guidance systems utilized a stabilized platform having a number of accelerometers mounted thereon. A plurality of gyroscopes were needed to provide a reference for the stabilized platform. Furthermore, in guidance systems of this type, very expensive precision instruments were required to perform the guidance and control functions.

PATENTED MAR 9 1971

William C. McCorkle, Jr.,
INVENTOR.

BY Harry M. Saragovitz
Edward J. Kelly
Herbert Berl
Harold W. Hilton

William C. McCorkle, Jr.,
INVENTOR.

BY Harry M. Saragovitz
Edward J. Kelly
Herbert Berl
Harold W. Hilton

DIRECTIONAL CONTROL-AUTOMATIC METEOROLOGICAL COMPENSATION (D.C.-AUTOMET) INERTIAL GUIDANCE SYSTEM FOR ARTILLERY MISSILES

The present invention overcomes the above noted defects by providing an inertial guidance system in which the requirement for a stabilized platform is removed and the requirement for gyroscopes to provide a reference for the stabilized meterological is also removed.

In describing the present invention, some principle sources of dispersion in fin stabilized missile will be explained first. A typical unguided fin stabilized rocket is launched form a short rail or tube, is accelerated to the required velocity by the reaction of the rocket jet during the burning period, and afterward coasts to the target in the same manner as other fin stabilized ballistic projectiles. Dispersion occurs because of a number of factors.

For example, during the launching operation, a small angular motion about a transverse axis is imparted to the rocket; part of this angular motion is repeatable and causes no error if allowance is made, but part is random and causes dispersion. This error source is called mallaunch.

Also, after launch the thrust may fail to pass precisely through the rocket center of gravity and a moment tending to rotate the rocket about a transverse axis is thus produced. As a rotation from this cause (or any other, such as mallaunch) occurs, the rocket attitude deviates from the desired direction and the thrust drives the rocket off the intended course. This error source is called thrust malalignment and is largely, but not entirely, due to manufacturing tolerances or imperfections. Also during the burning phase the rocket responds to winds which have a component normal to the flight path, called cross wind. Since the rocket is stable, it tends to rotate into the wind, and the thrust drives it off the intended path in the upwind direction. This effect is predictable, but proper allowance for it calls for measurement of the wind. The difference between the wind as assessed by measurement prior to flight and that actually experienced by the rocket during burning further contributes to dispersion.

Furthermore, after burning, the rocket behaves as a fin stabilized projectile. Dispersion is caused by the variations in the velocity achieved, and to a much lesser extent, by variations in distance traveled during burning. The velocity error is exactly analogous to the variations in muzzle velocity in a cannon, with the same result range dispersion. The errors in direction of the flight path accrued during burning are propagated through the coast phase and contribute both to range and azimuth dispersion. Also, variations in weight or drag coefficient of the rocket after burning cause range dispersion. Most important, atmospheric conditions along the path of the rocket to the target affect the path and must be taken into account. Winds and nonstandard atmospheric density perturb the normal trajectory, and these perturbations can be predicted if the winds and density variations are known. To the extent that the assessment of these meteorological factors is different from that actually experienced by the projectile in its flight, the compensation will be incorrect and further range and azimuth dispersion will accrue.

The rocket may have bent or misaligned fins which can cause dispersion, such dispersion arises during burning, and may increase after burnout. However, a slow roll is generally imparted during the burning period to reduce the effect of thrust malalignment, and the rolling motion persists (in practice it is usually maintained by a slight cant to the fins) during the coast phase. A roll of sufficient rate to appreciably reduce the effect of thrust malalignment is more than enough to make the effect of any aerodynamic asymmetry completely negligible (provided the roll rate and natural yawing frequency do not coincide or lie too close to each other).

In summary, the principal sources of dispersion in fin-stabilized rockets during burning are mallaunch, thrust malalignment, and malassessment of cross wind; after burning, variations in the velocity imparted during burning, variations in drag coefficient or burnout mass, and malassessment of winds and density along the trajectory. There are other lesser sources of error which will be mentioned in describing the invention claimed.

It is, therefore, an object of this invention to provide the minimum guidance to the free rocket necessary to make it insensitive to the disturbances discussed above, and to remove the necessity for making measurements of the meteorological factors.

It is another object of the present invention to provide a missile system having a guidance system composed of a few relatively simple and inexpensive components and having a high degree of accuracy.

It is a further object of the present invention to provide such a guidance system to control thrust direction during the booster propulsion phase of flight and thrust magnitude during the sustainer phase of flight.

A still further object of the present invention is to provide such a guidance system which does not require the use of a stabilized platform and reference gyroscopes therefor.

A yet further object of the present invention is to provide a guidance system in which a single accelerometer is utilized for terminating booster thrust, initiating sustainer phase of flight, and controlling sustainer thrust magnitude to maintain the missile in substantially a vacuum trajectory.

To accomplish these and other objects, the present invention includes a missile disposed for flight along a predetermined trajectory to a target. The trajectory includes booster propulsion and sustainer propulsion phases of flight. To maintain the missile in the desired trajectory at the proper velocity during the booster phase, the missile is provided with a directional control inertial guidance system. This directional control inertial guidance system is comprised of a gyro disposed for generation of an electrical signal indicating pitching and yawing of the missile. The signals actuate a plurality of injection valves disposed around the periphery of the motor for injecting fuel into the nozzle, by secondary injection, to produce moments which tend to restore the missile axis to the gyro spin axis.

The sustainer phase of flight is controlled by an accelerometer whose input axis is oriented along the longitudinal axis of the missile. The electrical signal from the accelerometer is integrated to obtain the electrical analogue of missile velocity. This velocity signal terminates the boost phase and initiates the sustainer phase upon reaching the desired preset velocity corresponding to the desired range. The accelerometer also provides electrical signals which are utilized to vary the magnitude of thrust of the missile during the sustainer phase of flight. The thrust is varied in response to axial accelerations acting on the missile to maintain zero net axial force on the missile and thus cause the missile to fly in a vacuum trajectory.

The above mentioned advantages and objects of my invention will become more readily apparent from the following detailed description, taken together with the accompanying drawings in which.

In describing the invention, a complete firing operation will be followed through from the laying operation to impact.

It is assumed target range and azimuth information are available, and that certain corrections due to earth's rotation, launcher and target relative altitude, etc. have been provided.

A missile is elevated to a predetermined angle for travel in a trajectory. The angle may be the same for all firings. For maximum range, this angle is 50° to 55°. The angle may be determined externally or internally by a preset level indicating device, many variations of which are known to the art.

Figure 1:
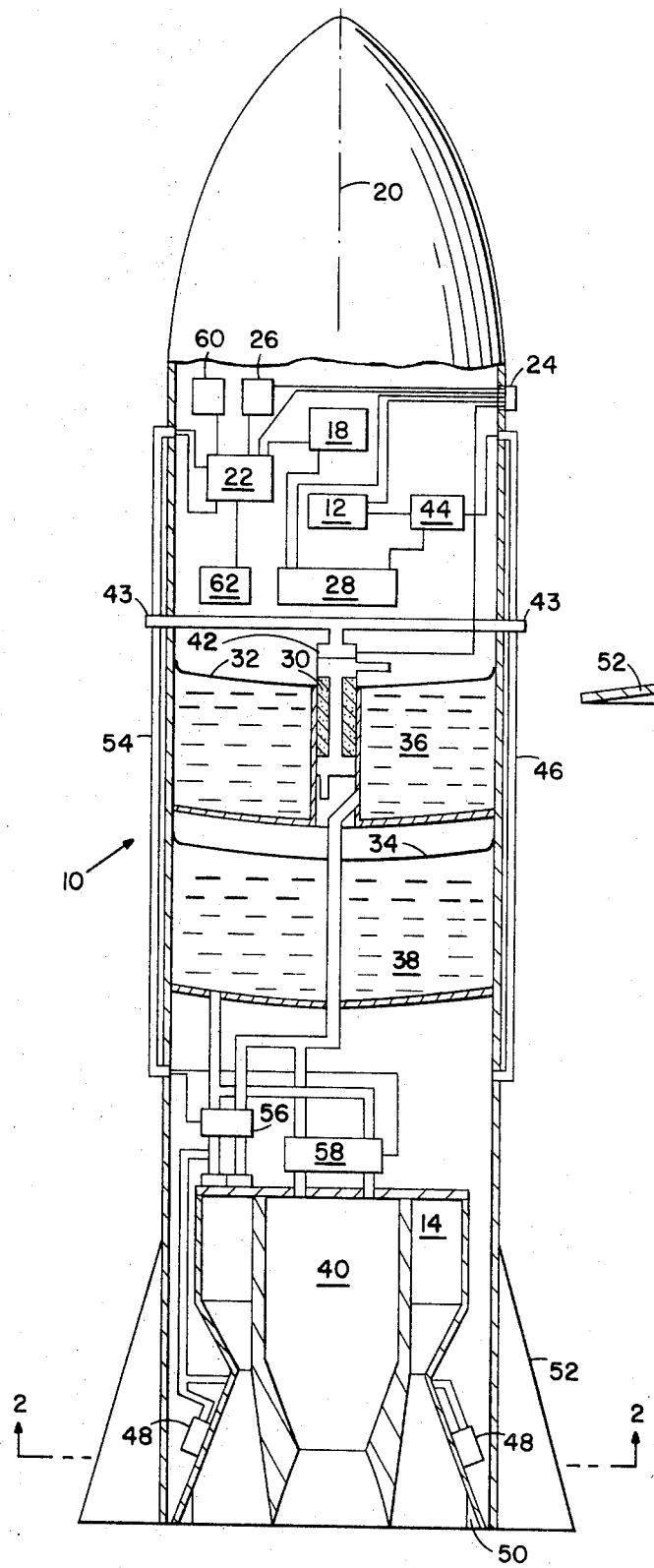
FIG. 1 is a partially cut away elevational view of a missile embodying my invention.
Figure 2:
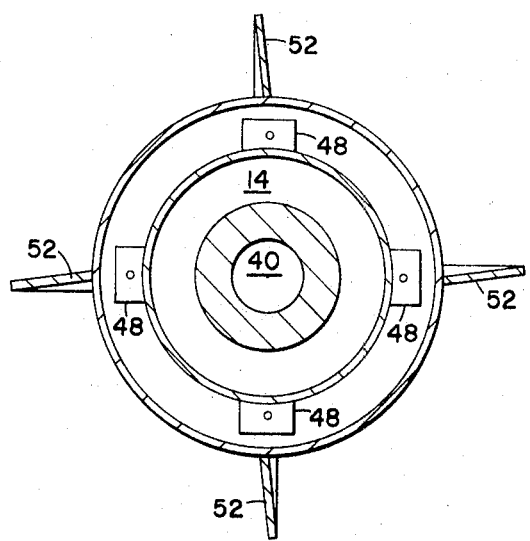
FIG. 2 is a sectional view along line 2–2 of FIG. 1 illustrating the concentric arrangement of the sustainer and booster motors of the present invention.

As is shown in FIG. 1, the missile 10 includes a gyro 12 which is mounted in the missile axis and is aimed both in azimuth and elevation. The most accurate method of performing this function would involve a reflecting surface on the gyro rotor itself, oriented so as to be normal to the true spin axis. Numerous alternate approaches exist, all with varying potential accuracies. In any event, by standard artillery procedures, the gyro spin axis is turned to the proper azimuth, and elevated to the required elevation, taken to be 50° for descriptive purposes here.

For control of range, a main boost motor 14 is provided and thrust of motor 14 is terminated at a predetermined speed, which is, except for minor correction, $$V = \sqrt{\frac{Rg}{\sin 2\theta}}$$

where $R$ is range, $g$ is earth's gravity and $\Theta$ is the boost flight path angle measured from the horizontal.

The preset velocity corresponding to the desired range is set into the missile guidance system, as a number for digital circuits, or as a voltage for electrical anolog techniques. A procedure for performing this operation is as follows: with missile 10 on a launcher (not shown) at firing elevation, an accelerometer 18, is set with its sensitive axis precisely oriented along the missile axis 20, or alternatively, is mounted so that its sensitive axis may be turned to the vertical. The object is for accelerometer 18 to read a precisely known fraction of earth $g$, as determined by the inclination of the sensitive axis from the vertical. By either knowing the angle precisely or turning it to the vertical (less precision is required for the latter), the precise input to the accelerometer, in terms of earth $g$, is known. The accelerometer is connected to an integrator 22 and the accelerometer and integrator are activated, and the accelerometer output is integrated for a precisely known time, say 10 seconds. The output of integrator 22 as a number or voltage, is read out at the umbilical connection to the missile 24. The output represents 10 $g$ sin $\Theta$ second, where $\Theta$ is the angle of elevation of the accelerometer sensitive axis from the horizontal. For $\Theta$ of 50°, 10 $g$ sin $\Theta$ represents a velocity of 75 meters/second. Suppose the desired range is 25,000 meters, which requires a boost velocity of 495 meters/second. Then the output of umbilical connection 24 of the 10 $g$ sin $\Theta$ input, which represents 75 meters/second, must be multiplied by 6.6 to obtain a magnitude representing 495 meters/second. This is done, and the new number or voltage is inserted back into the missile via umbilical connector 24 to a velocity cutoff, or range presetting device 26.

The missile is now ready to be fired. The azimuth, elevation, and range settings are completed. The firing sequence is initiated by an input via umbilical connector 24 which activates the missile power supply 28, spins up the rotor of gyro 12 and ignites a gas generator 30. The gas from the gas generator pressurizes a pair of pistons 32 and 34 in liquid fuel and oxidizer tanks 36 and 38, and starts the flow of propellants through appropriate frangible seals and plumbing to the booster and sustainer motors 14 and 40, respectively. Motors 14 and 40 are concentrically disposed in the missile. The propellants are hypergolic (for example, inhibited red fuming nitric acid and unsymmetrical dimethyl hydrazine) which ignite in the two chambers, and thrust is produced. The gas pressure on the pistons 32 and 34 is regulated by a pressure regulator 42, and the excess pressurizing gas is discharged overboard through two diametrically disposed tubes 43. The first motion produced by the resulting thrust closes an acceleration switch in integrator 22, and the output of accelerometer 18 begins to be integrated to produce a voltage (or number) proportional to velocity, minus the component of integrated earth gravity along the missile boost flight path. The ground connection to the missile guidance system via umbilical connector 24 is released just prior to first motion, and no further input to the missile is made. After a short travel on the launcher rails, the missile is in flight on its own.

Figure 4:
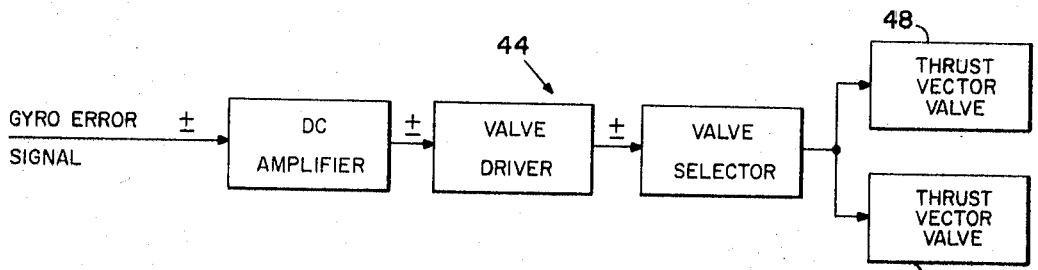
FIG. 4 is a schematic diagram showing the relationship of the gyro and thrust vector valves for the booster phase of flight.
Figure 3:
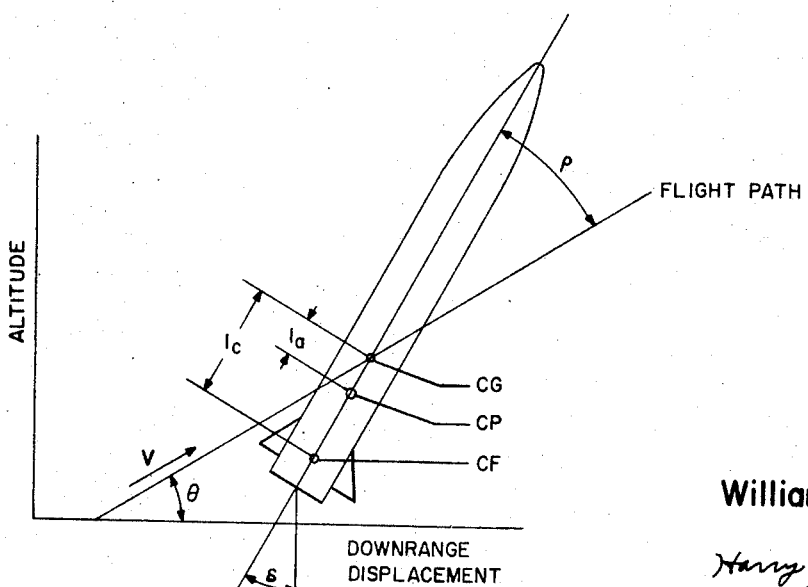
FIG. 3 is a diagrammatic view of a missile and the desired flight therefor and illustrating the coordinate system.

Steering of the missile during the boost phase is accomplished by gyro 12 and appropriate steering forces as shown in FIG. 4. The signals from the gyro include two signal outputs to two control channels indicating pitch and yaw of the missile axis relative to the gyro. Each channel may include in an electronic package 44, (FIGS. 1 and 4), a DC signal amplifier, valve driver, valve selection circuit and two injection valves 48. The gyro error signal is amplified by the amplifier and then passes through the valve driver and selection circuit to the proper valve through conduits 46. Valve selection depends upon the algebraic sign of the error signal. Valves 48 inject fuel into the nozzle in such a manner as to produce deviations in the rocket thrust in proportion to the gyro signals in each body-fixed plane, initially designated pitch and yaw, but rolling with the missile as it rolls. The secondary injection, by techniques well known in the art, produce moments which tend to restore the missile axis to the gyro spin axis. If the thrust deviation angle is denoted by $\delta$, and the angle between the gyro axis (reference direction) and missile axis is denoted by $\rho$, (FIG. 3) then the ratio $\delta/\rho$ is called $\gamma$, the gain. This relation exists in both the pitch and yaw body fixed planes, and the value of $\gamma$ is chosen so as to minimize the flight path deviation of the missile during the boost phase. It can be shown that the minimum response of the missile flight path to cross wind disturbances occurs when $\gamma$ is chosen so as to neutralize the upwind and downwind tendencies of the missile. If $\gamma$ is chosen too large, the attitude of the missile is maintained too rigidly, and a downwind drift results. If, on the other hand, $\gamma$ is chosen too small, the missile tends to weathercock into the wind too much, and the thrust drives the missile upwind. If the steering force is located at the missile nozzle, it can be shown that the optimum value of $\gamma$ is given by $$\gamma = \frac{1_a}{1_c - 1_a}$$

where $1_a$ is the moment arm of the aerodynamic center of pressure about the center of mass of the missile, and $1_c$ is the moment arm of the control forces about the center of mass. It must be pointed out that a stable missile, i.e., one with the aerodynamic center of pressure aft of the center of mass, is necessary for proper functioning of this guidance system.

Because the quantities $1_a$ and $1_c$ vary during the boost phase, due to the movement of the center of mass as propellant is consumed, and the shift in aerodynamic center of pressure as the Mach number increases, the optimum value of $\gamma$ changes during boost. If the accuracy requirements permit, a value of $\gamma$ representing a best average may be chosen; alternatively $\gamma$ may, by suitable programming of the electrical parameters, be made to follow the optimum value.

The choice of $\gamma$ is dictated by the requirement for removing the sensitivity to cross wind present in the free rocket. The proper choice of $\gamma$ results in virtually complete insensitivity to cross winds, whether steady or changing in distance and time. But there are other disturbances, and the optimum choice of $\gamma$ for cross winds in not optimum for the other prinicipal source of free rocket disturbance, thrust malalignment.

The optimum value of $\gamma$ for reducing thrust malalignment caused by an off axis CG. is infinity—the stiffest possible control in attitude. Rather than compromise the wind sensitivity, however, the gain, $\gamma$, is kept at the optimum value for minimum wind sensitivity, and the effect of thrust malalignment is further controlled, beyond that achieved by the cross wind optimized $\gamma$ by rolling the missile. The flight path deviation with no roll, for unit thrust malalignment angle, is $1/\gamma$. Since typical values of $\gamma$ are .3 to .4, this sensitivity, while much smaller than that for free rockets, is still unsatisfactorily large. If the rocket rolls through an angle $\psi$ during the boost phase, however, the sensitivity to unit thrust malalignment is reduced to $1/\gamma\psi$, provided the roll rate is reasonably uniform, and several complete revolutions are turned. Typically at least five or more complete revolutions will be turned during burning, and $\psi$ has a value of 30 or more radians. The roll rate need not be uniform to be effective, but the magnitude of the reduction in thrust malalignment effect depends on the particular roll rate history which occurs during burning.

The greatest effect of roll rate is achieved if the desired uniform roll rate is present at the time of release of launcher constraints. This may not be practicable, and an alternative is a slow buildup of roll rate coupled with a change in the valve of $\gamma$ from a high initial value to the value appropriate for minimum wind sensitivity after the roll rate is established, but before aerodynamic forces become very large. The time of change in $\gamma$ should be before a flight speed of .4 or .5 Mach numbers is reached. This approach takes advantage of the fact that at launch aerodynamic forces, and hence cross wind effects, are at a minimum, while the effects of missile misalignments are maximum at this time. Thus the value of $\gamma$ can be raised to reduce the effects of misalignments at this time, and lowered to compensate for wind effects when they become important as speed builds up. In the interval, the buildup of roll rate prevents any substantial effect of misalignments after $\gamma$ is reduced.

One way of producing the desired roll is to put fixed jet vanes 50 in the nozzle expansion cone, set at an angle to produce a roll torque. This torque would result in a continuous roll acceleration, except that as the missile velocity increases the stabilizing fins 52 ten to oppose roll rates greater or less than some rate proportional to the missile forward velocity and depending on their cant angle. The resultant of the jet vane torques and stabilizing fin torques tend to produce a roll rate rising rapidly at first, then perhaps decreasing slightly as the fins take effect, and finally increasing again in proportion to forward velocity as the fin cant torques become dominant.

Other rolling techniques may be used. For example, small auxiliary spin rockets, firing tangentially to produce a roll torque immediately after launch, represent an acceptable technique well known to the art and widely utilized.

Because of the rolling motion, it is important that the control restoring moments follow closely in phase and amplitude the gyro signals, lest an error detected in one channel provide, because of the rolling, a corrective force in the other channel. This difficulty will not appear if there is no phase lead or lag of output control forces in relation to control system inputs (i.e. gyro pitch and yaw signals) at the frequencies corresponding to missile roll rates. This requirement is apart from the phase and amplitude relations necessary for stabilization of the control system, affecting either the stability of subsystems or the missile pitch and yaw oscillations caused by control action. It is worth noting that, because of the relatively short duration of the boost phase, and the steadily increasing aerodynamic stability with missile velocity, control system stability in the classical sense of the location in the complex plane of the roots of the characteristic equation governing missile pitch and yaw, evaluated for fixed values of the coefficients in the equation, may not be relevant. In fact, entirely satisfactory operation of the boost phase directional guidance system may be obtained even though the system is unstable in the sense described above.

The remaining major source of free rocket dispersion mentioned previously is mallaunch. In a free rocket, any transverse angular velocity (mallaunch) initiated at launch persists until overwhelmed by aerodynamic stability. With the directional control system described here, corrective moments are applied immediately, and the resulting flight path errors are negligible small for any value of $\gamma$ which suffices to minimize wind sensitivity. The same applies to any initial misalignment of the missile centerline with the gyro spin axis, which spin axis is the intended direction of aim.

During the boost phase, gravity acts in the pitch plane to produce a downward bias. The missile control guidance system functions to cause acceleration to occur only along the direction of the gyro spin axis, regardless of external or internal disturbances. Superimposed on this acceleration along the gyro axis is, however, the gravitational acceleration in the vertical direction. The flight path acceleration is the resultant of missile acceleration along the gyro axis and the vertical acceleration due to gravity, added vectorially.

Because the missile tends to hold an attitude parallel to the gryo axis, the velocity perpendicular to the gyro axis resulting from the effect of gravity appears to the missile as an upward wind of magnitude $gt \sin \Theta$, where $\Theta$ is the elevation of the gryo axis. This steadily increasing gravity induced wind causes insignificant deviation from the flight path determined by the resultant of missile and gravitational acceleration, since the control gain $\gamma$, as previously described, has been optimized to minimize the flight path deviation due to cross wind.

Because of the effect of gravity, it is important that the missile axial acceleration, or axial force to missile mass ratio be reproducible from missile to missile, since the magnitude of the downward bias due to gravity is proportional to the ratio of missile acceleration to gravitational acceleration. If this ratio is not sufficiently reproducible for the accuracy requirements, further steps may be taken which will be described in detail below.

The directionally controlled boost phase continues until the output of accelerometer 18, after integration by integrator 22 to obtain missile velocity, becomes equal to the preset velocity, corresponding to the desired range, stored as a number or voltage at velocity cutoff device 26. The output of integrator 22 is compared with the preset velocity in a comparator 27 and the booster cutoff signal is initiated at, or perhaps slightly before the preset velocity value to allow for lags and thrust decay, the time the missile velocity reaches the preset velocity, and is transmitted via conduit 54 to a cutoff valve 56, which stops propellent flow to the boost motor and secondary injection valves 48.

The directional control boost phase is terminated at this point, and the sustain phase is initiated. Up until this time, the sustainer motor 40 has been operating at full thrust.

Figure 5:
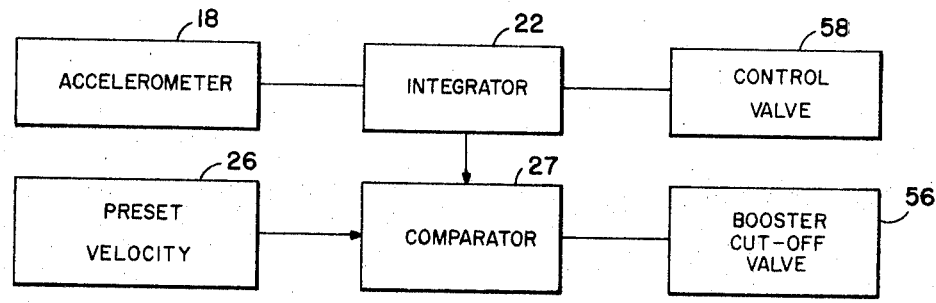
FIG. 5 is a schematic diagram showing the relationship of the accelerometer and throttling valves for the sustainer phase of flight.

The sustain phase utilizes the Automatic Meteorological Compensation (AUTOMET) technique. As shown in FIGS. 1 and 5 an output of integrator 22 which essentially represents the difference between the preset velocity at 26 and the missile velocity from the accelerometer 18 and intergrator 22, is used to operate a sustainer control valve 58 connected intermediate motor 40 and the fuel and oxidizer tanks. Control valve 58 is a throttling valve. If the missile velocity is higher than the preset velocity, the valve closes at a rate proportional to the difference. On the other hand, if the missile velocity is lower than the preset velocity, the valve opens at a rate proportional to the difference. In order to stabilize this control system, the signal representing the difference velocity from integrator 22 may also contain terms proportional to the axial acceleration, and of the proper sign to provide sustainer control system damping.

During the sustain phase, which occupies most of the total flight time of the missile, the difference between the preset velocity and missile velocity and missile velocity as represented by the integrated accelerometer output, is kept at null by the sustainer thrust. This means that the integral of the axial acceleration is kept constant, and that the average net axial force is zero. Because the average net axial force is zero during the sustain phase, or any appreciable part of it, the missile flight path is substantially the same as if it were in a vacuum. There will be transient excursions of the net axial force from the balance of thrust and drag, but these produce negligible effect as long as the net axial force, averaged over a small fraction of the total flight time, is zero.

It is clear why variations of atmospheric density or missile drag, or wind components along the flight path, cause no change in the flight path. These effects show up directly as increased or reduced thrust levels to keep the integrated accelerometer output at the preset value. For components of wind normal to the intended vacuum flight path, however, the reason why the flight path remains essentially unaltered is less obvious. Consider the direction of air flow over the missile body after encountering a cross wind. It is composed of a large component along the flight path direction because of the missile velocity, and a component normal to the flight path due to the cross wind. Because the missile is aerodynamically stable, it tends to align itself with the resultant direction of the air flow due to cross wind and motion along the flight path. In other words, only transient lateral forces act on the missile during the time of alignment with the air flow, and the motion is of a damped oscillatory nature whose integrated effect is very small. After alignment with the air flow caused by the cross wind and forward velocity, there exists no steady lateral force on the missile, and the control system holds the average net axial force at zero by varying thrust. Thus the missile center of mass continues undisturbed along the vacuum flight path, while the missile attitude is slightly offset from the tangent to the flight path to maintain alignment with the air flow. A common analogous situation is that of an aircraft holding an upwind heading to compensate for cross wind, or a boat heading upstream in order to make a direct crossing of a stream.

In order minimize during the sustain phase the effect of aerodynamic asymmetries which might produce a body fixed steady lateral force, the roll initiated during the boost phase is continued throughout flight by the cant built into the stabilizing fins. The roll rate is not important, except that it is desirable to keep it above the natural yawing frequency of the missile to avoid amplification of the yawing motion when roll and yawing frequencies lie too near each other. The reason for choosing the roll rate above the yawing frequency is that the latter may drop to very low values when the missile is traversing rarefied atmosphere, while the equilibrium roll rate is not affected by air density. Hence if the roll rate is initially less than the yawing frequency, they may pass through each other during the flight.

It should be pointed out that the actual missile velocity along the flight path is not constant, even though the integrated accelerometer output is kept constant by the thrust control system. This is because the accelerometer sensitive mass and all other parts of the missile are equally affected by gravity, hence the missile changes velocity due to gravity with no indication appearing at the accelerometer output. The horizontal velocity component remains constant, but the vertical velocity component after the boost phase is steadily reduced by gravity, passing through zero at the summit of the trajectory, then increasing in the downward direction, in exactly the same manner as any ballistic trajectory in vacuo.

For ranges near the maximum range of the missile, as determined by the propellant capacity and gross missile weight, the sustain phase of the flight may be terminated by timer 60. Because of the remaining relatively short time to target impact, the missile will deviate little from a predictable trajectory if the AUTOMET control is terminated, but a relatively large amount of propellant will be saved, thereby permitting a missile of less gross weight than if operation were maintained to impact. The actual missile velocity in the terminal phase approaches the velocity at booster cutoff, and this, together with the increasing air density at lower levels, requires steadily increasing sustainer thrust to overcome drag and maintain zero axial acceleration. The duration of the free flight terminal phase will depend on the required accuracy, with a less stringent accuracy requirement permitting more terminal free flight.

At ranges less than maximum range, the free flight phase will be shorter, and at all ranges less than a fraction of the maximum range, depending on the free flight duration chosen for maximum range, the sustain phase may last until impact.

It was mentioned above that it was assumed that the booster thrust level was sufficiently reproducible to permit satisfactory operation, from the accuracy standpoint. This may not always be true, depending on the accuracy requirements and the booster reproducibility. The requirement for booster thrust history reproducibility stems from several separate effects on accuracy. One concerns the effect of gravity mentioned previously, in that the bias in the vertical plane depends on the ratio of average boost acceleration to the component of gravity normal to the intended boost flight path. This effect will not result in significant impact error if the boost flight path has an elevation near that which produces maximum range for a given boost velocity, i.e., 45°. It will, however, affect the time of flight to impact.

The component of gravity along the flight path has the effect of reducing the actual velocity from that indicated by the integrated accelerometer output, sometimes called the inertial velocity. If the average boost acceleration varies from missile to missile, then the time to teach the preset inertial velocity must vary, hence the actual missile velocity will differ by varying amounts from the preset velocity because of the varying time of action of the gravity component. This will be partly compensated by the fact that the actual distance traversed during the boost phase will vary in inverse proportion to the average boost acceleration, but there will nevertheless be a net error due to booster average thrust variation.

A method of compensation for lack of booster thrust reproducibility, or to improve reproducibility, takes advantage of the variable thrust sustainer and control system during the boost phase. A voltage or number is generated by a velocity increase program mechanism 62, connected to integrator 22. The generated voltage or number is proportional to and increases with time approximately as the expected missile velocity under the action of the nominal booster thrust plus one-half of the sustainer maximum thrust. The output of mechanism 62 starts from zero and is initiated by the same switch which starts the integrator 22 to integrate the output of accelerometer 18 with first motion of the missile. The output of mechanism 62 is actually a function which is the time integral of the quantity thrust minus drag divided by the mass (which decreases uniformly as propellant is consumed), and is easily approximated to the required accuracy by several straight line segments. The difference between the signal from mechanism 62, which is a programmed velocity increased during boost, and the measured velocity from accelerometer 18 and integrator 22 is used to control the sustainer thrust in the same manner as is described supra during the sustain phase. The basic difference is that during the sustain phase, the inertial velocity (i.e., output of integrator 22) is controlled to the constant preset velocity, while during the boost phase, it is controlled to a steadily increasing velocity program supplied by mechanism 62 which duplicates the nominally expected velocity program under the action of the booster and one-half the sustainer thrust. When the preset velocity on cutoff device 26 is reached, the booster cutoff signal is also used to disconnect mechanism 62 and connect cutoff device 26 so that the sustainer thrust is subsequently regulated to keep the difference difference between cutoff device 26 and the output of integrator 22 at null. Clearly, this system permits compensation for high or low values of the booster thrust up to one-half the maximum thrust of the sustainer, which is assumed variable from off to full thrust.

It should be readily apparent that applicant has provided a missile system having the accuracy and range of a guided missile with the low cost and reliability approaching that of a free rocket.

Obviously, numerous modifications and variations of the present invention are possible in light of the above teachings. It is, therefore, to be understood that within the scope of the appended claims the invention may be practiced, otherwise, than as specifically described herein.

I claim:

1. A missile disposed for flight according to a planned trajectory ending in a target including booster propulsion and sustainer propulsion phases of flight, said missile provided with a booster motor disposed for providing substantially constant thrust during operation thereof, and a sustainer motor disposed for providing thrust during the booster and sustainer phase of flight with the magnitude of the thrust being variable in the sustainer phase; a gyro mounted in the missile with the spin axis along the longitudinal axis of the missile, said gyro disposed for providing a signal voltage proportionate to the amount of deviation of said missile axis from said spin axis responsive to said deviations; booster control means disposed for actuation by said gyro signal voltage for creating pressure differentials across the propulsive gases of said booster motor for thrust vectoring of said missile to restore said missile axis in alignment with said gyro spin axis during said booster propulsion phase of flight; accelerometer means mounted along said longitudinal axis of said missile for producing a signal voltage proportionate to the difference between the actual missile velocity and a desired velocity, said accelerometer signal disposed for terminating booster thrust when said difference in actual and desired velocity is null; sustainer control means actuatable by said accelerometer signals for varying the thrust of said sustainer to maintain the difference in said actual and desired velocities at null and thus maintain zero net axial force on said missile in the sustainer phase of flight.

2. A missile as in claim 1 wherein said booster control means includes a plurality of injector valves mounted around the periphery of said booster motor and connected to a source of fluid under pressure, said valves disposed for selective actuation to control the direction of thrust from said booster, and actuating means disposed for actuation of said valves in response to signals from said gyro.

3. A missile as in claim 2 wherein said actuating means includes mechanism electrically connected to said gyro to receive error signals therefrom in pitch and yaw and to selectively actuate said injector valves for diverting the direction of thrust of said booster motor to correct for said errors.

4. A missile as in claim 3 wherein said booster motor of said missile is provided with a plurality of fixed jet vanes disposed therein, said jet vanes mount at an angle to the longitudinal axis of said missile and projecting interiorly of said booster motor to produce a roll torque on said missile; and, fins mounted on the outer periphery of said missile and canted at an angle to the longitudinal axis of said missile for maintaining a predetermined roll of said missile in response to initiation of said roll torques.

5. A missile as in claim 4 with said missile including a pair of propellant tanks connected to said booster and sustainer motors, said tanks provided with pistons disposed for movement therein for forcing said propellants to said booster and sustainer motors; and, means for moving said pistons.

6. A missile as in claim 4 wherein said sustainer control means includes a throttling valve communicating with said sustainer motor and said propellants to proportionately control flow of said propellants to said sustainer motor to vary the thrust thereof in response to the difference in thrust and drag of the missile; said throttling valve being disposed for actuation by said accelerometer output signal voltage.

7. A missile as in claim 6 wherein said sustainer motor is disposed in said missile with its longitudinal axis coincident with the longitudinal axis of said missile.

8. A missile as in claim 7 wherein said booster motor is concentrically disposed about said sustainer motor.

9. A missile as in claim 8 wherein said means for moving said pistons comprises a gas generator disposed for ignition for producing gases for exerting pressure on said pistons for movement thereof to force propellant from said propellant tanks.